(12) United States Patent
Sindelar et al.

(10) Patent No.: US 12,241,569 B2
(45) Date of Patent: Mar. 4, 2025

(54) INSTALLATION APPARATUS FOR PIPE FITTINGS AND METHOD OF VERIFYING PROPER INSTALLATION

(71) Applicant: LenLok Holdings, LLC, Willoughby, OH (US)

(72) Inventors: Mark John Sindelar, Shaker Heights, OH (US); William Lennon, Hunting Valley, OH (US)

(73) Assignee: LENLOK HOLDINGS LLC, Willoughby, OH (US)

( * ) Notice: Subject to any disclaimer, the term of this patent is extended or adjusted under 35 U.S.C. 154(b) by 522 days.

(21) Appl. No.: 17/221,315

(22) Filed: Apr. 2, 2021

(65) Prior Publication Data
US 2021/0310589 A1 Oct. 7, 2021

Related U.S. Application Data

(60) Provisional application No. 63/004,576, filed on Apr. 3, 2020.

(51) Int. Cl.
*B21D 39/04* (2006.01)
*B23P 19/02* (2006.01)
(Continued)

(52) U.S. Cl.
CPC .......... *F16L 19/106* (2013.01); *B21D 39/046* (2013.01); *B23P 19/02* (2013.01);
(Continued)

(58) Field of Classification Search
CPC ...... B21D 39/046; B23P 11/005; B23P 19/02; B23P 19/047; B25B 27/10; B25B 28/00;
(Continued)

(56) References Cited

U.S. PATENT DOCUMENTS 3,019,520 A 2/1962 Woolley
3,769,678 A 11/1973 Marsden
(Continued)

FOREIGN PATENT DOCUMENTS

EP 2 130 625 A1 12/2009
EP 2851649 A1 4/2013
(Continued)

OTHER PUBLICATIONS

Kistler, CoMo II Control Monitor, 2003, 1-8 (Year: 2003).*
(Continued)

*Primary Examiner* — Jermie E Cozart
(74) *Attorney, Agent, or Firm* — Chrisman Gallo Tochtrop LLC

(57) ABSTRACT

An installation apparatus for connecting a fluid fitting to a fluid element includes a tool mechanism having a first abutment surface and a second abutment surface that faces and is movable relative to the first abutment surface; a first sensor configured to detect a first property of the installation apparatus or fluid fitting and provide a first output corresponding to the first property; a second sensor configured to detect a second property of the installation apparatus or fluid fitting and provide a second output corresponding to the second property; and a processing unit that is configured to generate a first resulting data set based on the first output and second output, and compare the resulting data set with a first predetermined data set to determine if the first resulting data set is compliant with the first predetermined data set.

18 Claims, 8 Drawing Sheets

(51) Int. Cl.
*B23P 19/04* (2006.01)
*F16L 13/14* (2006.01)
*F16L 19/10* (2006.01)
*B23P 11/00* (2006.01)
*B25B 27/10* (2006.01)
*B25B 28/00* (2006.01)

(52) U.S. Cl.
CPC ........... *F16L 13/146* (2013.01); *B23P 11/005* (2013.01); *B23P 19/047* (2013.01); *B25B 27/10* (2013.01); *B25B 28/00* (2013.01); *F16L 2201/10* (2013.01); *Y10T 29/49776* (2015.01); *Y10T 29/49925* (2015.01); *Y10T 29/53065* (2015.01)

(58) Field of Classification Search
CPC ................ F16L 13/146; F16L 2201/10; Y10T 29/49776; Y10T 29/53065
See application file for complete search history.

(56) References Cited

U.S. PATENT DOCUMENTS

| | | | |
|---|---|---|---|
| 4,189,817 A | 2/1980 | Moebius | |
| 4,726,284 A | 2/1988 | Green | |
| 5,110,163 A | 5/1992 | Benson et al. | |
| 5,305,510 A | 4/1994 | Croft et al. | |
| 5,402,560 A | 4/1995 | Rode | |
| 5,694,670 A | 12/1997 | Hosseinian et al. | |
| 5,709,418 A | 1/1998 | Benson et al. | |
| 6,128,814 A * | 10/2000 | Belka | B23P 19/02 29/466 |
| 6,131,964 A | 10/2000 | Sareshwala | |
| 6,266,860 B1 | 7/2001 | Kiebler | |
| 6,434,808 B1 | 8/2002 | McKay | |
| 6,505,659 B1 | 1/2003 | Hummel | |
| 6,607,136 B1 | 8/2003 | Atsmon et al. | |
| 6,618,919 B1 | 9/2003 | McKay | |
| 6,692,040 B1 | 2/2004 | McKay et al. | |
| 6,834,556 B2 | 12/2004 | Cain et al. | |
| 7,090,030 B2 | 8/2006 | Miller | |
| 7,158,034 B2 | 1/2007 | Corbett, Jr. | |
| 7,337,514 B2 | 3/2008 | McKay | |
| 7,575,257 B2 | 8/2009 | McKay | |
| 7,616,119 B2 | 11/2009 | Corbett, Jr. | |
| 7,984,538 B2 | 7/2011 | McKay | |
| 8,004,414 B2 | 8/2011 | Angell et al. | |
| 8,256,079 B2 | 9/2012 | Hwang | |
| 8,393,646 B2 | 3/2013 | Galle et al. | |
| 8,439,404 B2 | 5/2013 | Anton et al. | |
| 8,683,667 B2 | 4/2014 | Hwang | |
| 8,720,318 B2 | 5/2014 | Fukano et al. | |
| 8,736,281 B2 | 5/2014 | Lowe et al. | |
| 8,739,376 B1 | 6/2014 | Vidmar | |
| D712,769 S | 9/2014 | Betsinger | |
| 8,870,237 B2 | 10/2014 | Sindelar | |
| 9,010,810 B2 | 4/2015 | Anton et al. | |
| 9,278,441 B2 | 3/2016 | Sindelar | |
| 9,378,448 B2 | 6/2016 | Ching et al. | |
| 9,400,070 B2 | 7/2016 | Anton et al. | |
| 10,010,925 B2 | 7/2018 | Kajitani et al. | |
| 10,223,556 B2 | 3/2019 | Ching et al. | |
| 10,663,093 B2 | 5/2020 | Lennon | |
| 2003/0103856 A1 | 6/2003 | Amburgey | |
| 2003/0167614 A1 | 9/2003 | Morrison et al. | |
| 2004/0122619 A1* | 6/2004 | Malone | B21D 39/046 702/182 |
| 2005/0183258 A1 | 8/2005 | McKay | |
| 2006/0059677 A1 | 5/2006 | McKay | |
| 2006/0186666 A1 | 8/2006 | McKay | |
| 2006/0202821 A1 | 9/2006 | Cohen | |
| 2006/0250245 A1 | 11/2006 | Forster | |
| 2007/0248435 A1 | 10/2007 | Hirotomi | |
| 2007/0276201 A1 | 11/2007 | Lee et al. | |
| 2008/0252459 A1 | 10/2008 | Butler et al. | |
| 2009/0256050 A1 | 10/2009 | Huang | |
| 2011/0017681 A1 | 1/2011 | Bibey et al. | |
| 2011/0133759 A1 | 6/2011 | Chamberlin | |
| 2011/0163536 A1 | 7/2011 | Sindelar | |
| 2011/0181399 A1 | 7/2011 | Pollack et al. | |
| 2011/0287713 A1 | 11/2011 | Ali et al. | |
| 2012/0126008 A1 | 5/2012 | Binmore | |
| 2013/0056538 A1 | 3/2013 | Binmore | |
| 2013/0168623 A1 | 7/2013 | Jacobs | |
| 2014/0000386 A1 | 1/2014 | Malhan et al. | |
| 2014/0360279 A1 | 12/2014 | Jenkins | |
| 2015/0054621 A1 | 2/2015 | Lin et al. | |
| 2015/0083810 A1 | 3/2015 | Ching et al. | |
| 2015/0139715 A1 | 5/2015 | Exner et al. | |
| 2015/0252922 A1 | 9/2015 | Anton et al. | |
| 2017/0089496 A1 | 3/2017 | Lennon | |
| 2019/0033796 A1 | 1/2019 | Vincent et al. | |

FOREIGN PATENT DOCUMENTS

| | | | |
|---|---|---|---|
| EP | 2 921 242 A1 | 9/2015 | |
| JP | H01-143730 A | 6/1989 | |
| JP | 2003-302332 A | 10/2003 | |
| RU | 2269055 C2 | 1/2006 | |
| WO | 02/25161 A1 | 3/2002 | |
| WO | 2008/005547 A2 | 1/2008 | |
| WO | WO-2008012811 A2 * | 1/2008 | ............. B25B 27/10 |
| WO | 2009/122166 A2 | 10/2009 | |
| WO | 2013/116087 A1 | 8/2013 | |
| WO | 2013/168720 A1 | 11/2013 | |
| WO | 2014-115660 A1 | 7/2014 | |
| WO | 2015/099763 A1 | 7/2015 | |

OTHER PUBLICATIONS

Kistler CoMo II (Year: 2003).*
Maxwell, et al.; "GMC 2013: Piping Misalignment and Vibration Related Fatigue Failures;" www.BetaMachinery.com; Dated Nov. 1, 2013; pp. 1-10.
Swedberg; "Campbell Uses RFID Sensor Tags to Test Cooking Equipment;" RFID Journal; Dated Jun. 5, 2015; pp. 1-2.
International Search Report and Written Opinion for related International Application No. PCT/US2016/053324 mailed Dec. 22, 2016.
Extended European Search Report for related European Application No. 16849693.3 dated Aug. 21, 2019.
International Preliminary Report on Patentability dated Sep. 29, 2022 for corresponding International Application No. PCT/US2021/025555.
International Search Report for corresponding International Application No. PCT/US2021/025555 mailed Jul. 19, 2021.
Written Opinion for corresponding International Application No. PCT/US2021/025555 dated Jul. 19, 2021.
Phastite® Tube Connectors Catalog, Parker, 2008, See pp. 28-30.

* cited by examiner

INSTALLATION APPARATUS FOR PIPE FITTINGS AND METHOD OF VERIFYING PROPER INSTALLATION

CROSS-REFERENCE TO RELATED APPLICATIONS

This application claims the benefit of U.S. provisional application Ser. No. 63/004,576 filed Apr. 3, 2020, the contents of which are incorporated by reference.

FIELD OF THE INVENTION

The present disclosure relates generally to installation apparatus for pipe fittings, and more particularly, methods of verifying proper installation of a pipe fitting with the installation apparatus.

BACKGROUND OF THE INVENTION

Generally, one type of fitting for fluid conduits, such as tubes or pipes, includes a connector body that fits over the fluid conduit and a swage ring which compresses and/or physically deforms the connector body against the outside surface of the fluid conduit to provide one or more seals around the fluid conduit that establish a strong and leak proof mechanical connection.

Prior art tools for assembling such a fitting to a fluid conduit often include a fixed jaw or frame, a movable jaw or frame, and one or more hydraulic cylinders for moving the movable frame toward the fixed frame. The frames can be configured to grip the swage ring and the connector body such that, upon actuation, the frames forcibly move the swage ring over the connector body thereby causing the connector body to compress or move radially into the fluid conduit to provide a seal and a mechanical connection. When the swaging is complete, hydraulic pressure in the one or more hydraulic cylinders is reduced to allow the tool to be removed from the fitting.

BRIEF SUMMARY OF THE INVENTION

The following presents a simplified summary of example embodiments of the invention. This summary is not intended to identify critical elements or to delineate the scope of the invention.

In accordance with a first aspect, an installation apparatus for connecting a fluid fitting to a fluid element includes a tool mechanism that is operable to connect said fluid fitting to said fluid element, the tool mechanism including a first abutment surface and a second abutment surface that faces and is movable relative to the first abutment surface; a first sensor configured to detect a first property of the installation apparatus or fluid fitting and provide a first output corresponding to the first property; a second sensor configured to detect a second property of the installation apparatus or fluid fitting and provide a second output corresponding to the second property; and a processing unit that is configured to generate a first resulting data set based on the first output and second output, and compare the resulting data set with a first predetermined data set to determine if the first resulting data set is compliant with the first predetermined data set.

In one example of the first aspect, the processing unit is configured to acquire the first output from the first sensor at discrete times to generate a first data set corresponding to the first property over time, and acquire the second output from the second sensor at the same discrete times to generate a second data set corresponding to the second property over time.

In another example of the first aspect, the processing unit is configured to correlate the first data set and the second data set with respect to the discrete times to generate the resulting data set, such that the first resulting data set corresponds to the first property versus the second property. In one example, the first predetermined data set includes a maximum data set and a minimum data set, the maximum data set corresponding to a maximum first property per second property, the minimum data set corresponding to a minimum first property per second property. In one example, the processing unit is configured to determine if the first resulting data set is compliant with the first predetermined data set by determining if the first resulting data set is between or equal to the maximum data set and minimum data set.

In yet another example of the first aspect, the processing unit is configured to provide an output based on whether the first resulting data set is compliant with the first predetermined data set.

In still yet another example of the first aspect, the first property corresponds to a force property and the second property corresponds to a spatial property.

In another example of the first aspect, the first property corresponds to a strain property and the second property corresponds to a spatial property.

In yet another example of the first aspect, the installation apparatus further includes a third sensor configured to detect a third property of the installation apparatus or fluid fitting and provide a third output corresponding to the third property, wherein the processing unit is configured to generate a second resulting data set based on the second output and third output, and compare the second resulting data set with a second predetermined data set to determine if the second resulting data set is compliant with the second predetermined data set. In one example, the processing unit is configured to provide an output based on whether the first resulting data set and second resulting data set are both in respective compliance with the first predetermined data set and second predetermined data set.

In accordance with a second aspect, a method is provided for connecting a fluid fitting to a fluid element with an installation apparatus that includes a tool mechanism, a first sensor, a second sensor, and a processing unit having an output device. The method includes operating the tool mechanism to connect the fluid fitting to the fluid element; operating the first sensor during the step of operating the tool mechanism, wherein the first sensor detects a first property of the installation apparatus or fluid fitting and provides the first output corresponding to the first property; operating the second sensor during the step of operating the tool mechanism, wherein the second sensor detects a second property of the installation apparatus or fluid fitting and provides the second output corresponding to the second property; and operating the processing unit. The processing unit generates the first resulting data set based on the first output and second output, compares the first resulting data set with the first predetermined data set to determine if the first resulting data set is compliant with the first predetermined data set, and electrically operates the output device to provide an output based on whether the first resulting data set is compliant with the first predetermined data set.

In one example of the second aspect, the processing unit acquires the first output from the first sensor at discrete times to generate a first data set corresponding to the first property over time, and acquires the second output from the second sensor at the same discrete times to generate a second data set corresponding to the second property over time. In one example, the processing unit correlates the first data set and the second data set with respect to the discrete times to generate the resulting data set, such that the first resulting data set corresponds to the first property versus the second property. In one example, the first predetermined data set includes a maximum data set and a minimum data set, the maximum data set corresponding to a maximum first property per second property, the minimum data set corresponding to a minimum first property per second property. In one example, the processing unit determines if the first resulting data set is compliant with the first predetermined data set by determining if the first resulting data set is between or equal to the maximum data set and minimum data set.

In another example of the second aspect, the output device includes an indicator light.

In yet another example of the second aspect, the first property corresponds to a force property and the second property corresponds to a spatial property.

In still yet another example of the second aspect, the first property corresponds to a strain property and the second property corresponds to a spatial property.

In another example of the second aspect, the installation apparatus further includes a third sensor that detects a third property of the installation apparatus or fluid fitting and provides a third output corresponding to the third property. Moreover, the processing unit generates a second resulting data set based on the second output and third output, and compares the second resulting data set with a second predetermined data set to determine if the second resulting data set is compliant with the second predetermined data set.

In yet another example of the second aspect, the fluid fitting includes a coupling body defining a bore for receiving the fluid element therein at an end of the coupling body, and a ring configured to fit over the end of the coupling body for mechanically attaching said coupling body to the fluid element, the coupling body including a seal portion for engaging the fluid element. Moreover, the method includes providing the fluid fitting in a pre-installed configuration wherein the drive ring is arranged over the end of the coupling body, arranging the fluid element within the bore of the coupling body, and arranging the fluid fitting relative to the tool mechanism while the fluid fitting is in the pre-installed configuration, such that the first abutment surface faces a surface of the coupling body and the second abutment surface faces a surface of the drive ring. The step of operating the tool mechanism axially forces the drive ring along a longitudinal axis such that the drive ring deforms elastically to an expanded condition and applies a compressive force to the seal portion sufficient to cause permanent deformation of the coupling body such that a tooth of the seal portion bites into the fluid element to thereby attach the fluid element to the coupling body in a non-leaking manner.

BRIEF DESCRIPTION OF THE DRAWINGS

The above and other features, aspects, and advantages of the present application are better understood when the following detailed description of the present application is read with reference to the accompanying drawings, in which.

DETAILED DESCRIPTION

Figure 1:
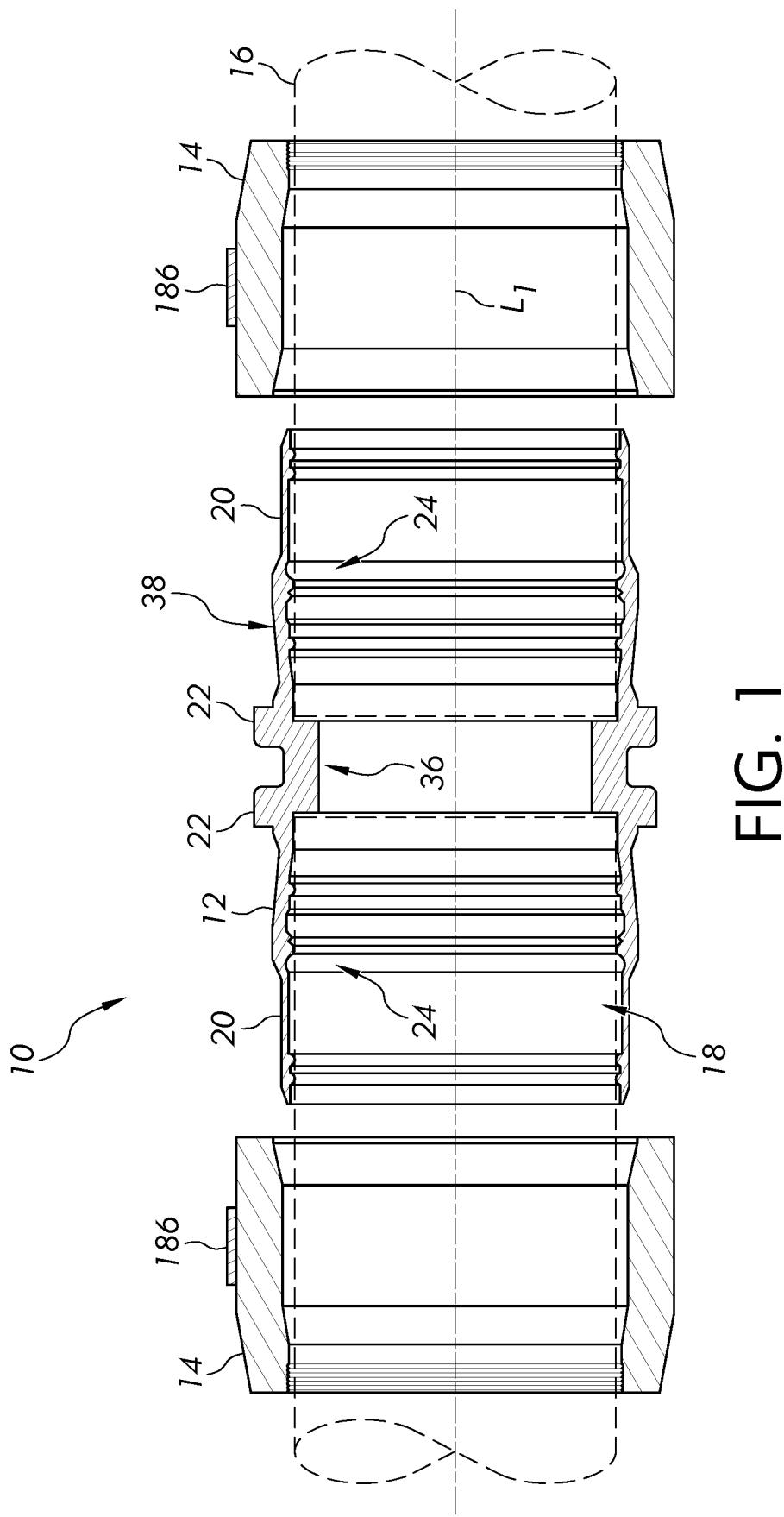
FIG. 1 is a cross-sectional view of an example fluid fitting.

The following is a detailed description of illustrative embodiments of the present application. As these embodiments of the present application are described with reference to the aforementioned drawings, various modifications or adaptations of the methods and or specific structures described may become apparent to those skilled in the art. All such modifications, adaptations, or variations that rely upon the teachings of the present application, and through which these teachings have advanced the art, are considered to be within the spirit and scope of the present application. Hence, these descriptions and drawings are not to be considered in a limiting sense as it is understood that the present application is in no way limited to the embodiments illustrated. Moreover, certain terminology is used herein for convenience only and is not to be taken as a limitation. Still further, in the drawings, the same reference numerals are employed for designating the same elements.

Figure 2:
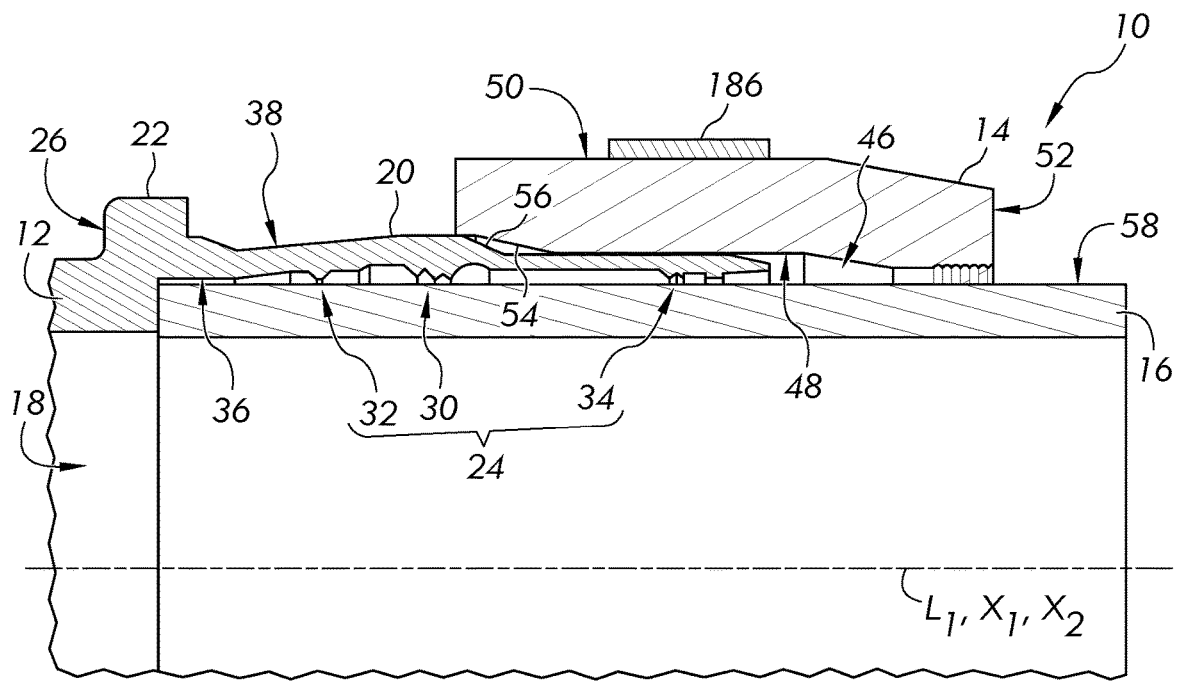
FIG. 2 is a detailed cross-sectional view of the fitting in a pre-installed configuration.
Figure 3:
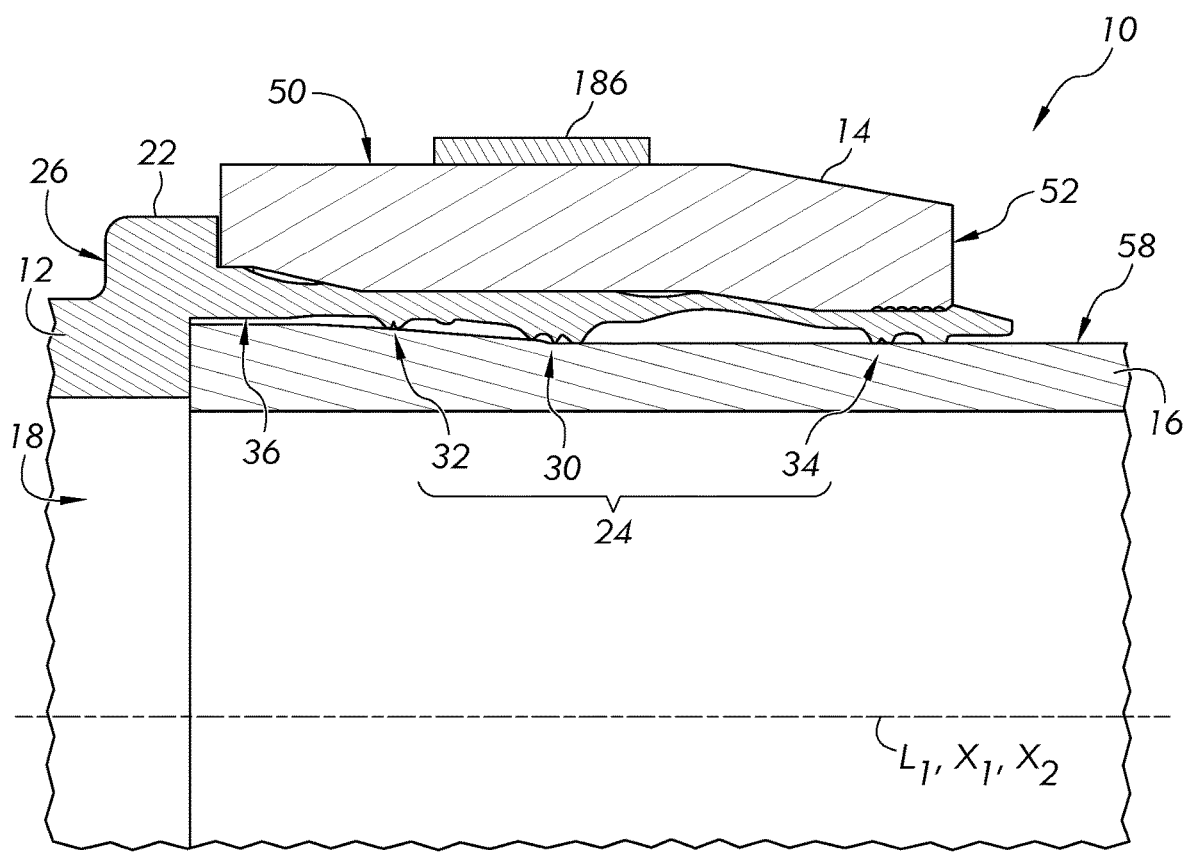
FIG. 3 is another detailed cross-sectional view of the fitting in an installed configuration.

Turning to FIG. 1-3, an example fitting 10 is illustrated that can be connected to two or more fluid elements. For the purposes of this disclosure, a "fluid element" refers to a pipe, tube, fitting, or any other element that is configured to convey, deliver, and/or receive fluid). Moreover, a "fitting" refers to any element that can be connected to two or more fluid elements to fluidly couple the two or more fluid elements together.

FIGS. 1-3 show cross-sectional views of the fitting 10 taken along a plane that is parallel to and contains a longitudinal axis $L_1$. The components of the fitting 10 as arranged in FIGS. 1-3 are generally symmetrical about the longitudinal axis $L_1$ such that they extend completely around the longitudinal axis $L_1$ in a symmetrical manner. FIG. 1 shows the components of the fitting 10 generally aligned along the longitudinal axis $L_1$. Meanwhile, FIGS. 2 & 3 respectively show one side of the fitting 10 (i.e., the right side as viewed in FIG. 1) in a pre-installed configuration and an installed configuration. It is understood that the opposite side of the fitting 10 (i.e., the left side as viewed in FIG. 1) can comprise similar pre-installed and installed configurations that are mirrored along the longitudinal axis $L_1$.

The fitting 10 in the present example includes a coupling body 12 and two drive rings 14 (sometimes referred to as "swage rings") that can be slid over the coupling body 12 to join a pair of pipe bodies 16 to the fitting 10, as discussed further below. The pipes 16 can be thin walled or thick walled pipes, such as those ranging in size from ¼" NPS to 4" NPS. However, other pipe sizes may also derive a benefit from the example fitting 10. Moreover, fitting 10 can be similarly connected to other types of fluid elements such as flanges, tees, and other fittings.

As shown in FIGS. 2 & 3, the coupling body 12 defines a bore 18 that extends through the coupling body 12 for receiving a pipe 16 therein at each end. The coupling body 12 extends symmetrically about a central axis $X_1$ of the bore 18, and includes a sleeve portion 20, a flange portion 22, and a seal portion 24. The flange portion 22 extends radially outward from the sleeve portion 20 and defines an annular abutment surface 26 that extends radial to and concentric with the central axis $X_1$. Moreover, the seal portion 24 includes a main seal 30, an inboard seal 32, and an outboard seal 34, wherein each seal 30, 32, 34 comprises one or more teeth that extend radially inward from the sleeve portion 20. It is contemplated that the seal portion 24 could include other numbers and/or arrangements of seals. The coupling body 12 has an interior surface 36 that faces the bore 18 and defines an interior profile of the coupling body 12, and an exterior surface 38 that faces away from the bore 18 and defines an exterior profile of the coupling body 12.

The drive ring 14 is similarly an open-center body that defines a bore 46 extending through the drive ring 14 for receiving coupling body 12 therein. The drive ring 14 extends symmetrically about a central axis $X_2$ of the bore 46, and includes an interior surface 48 that faces the bore 46, an exterior surface 50 that faces away from the bore 46, and an annular abutment surface 52 that extends radial to the central axis $X_2$.

The coupling body 12 and drive ring 14 can be initially assembled in the pre-installed configuration shown in FIG. 2. Specifically, the drive ring 14 can be arranged over the end of the coupling body 12 such that the central axes $X_1$, $X_2$ of the coupling body 12 and drive ring 14 are collinear with the longitudinal axis $L_1$ and the coupling body 12 is arranged within the bore 46 of the drive ring 14. In this configuration, the abutment surfaces 26, 52 of the coupling body 12 and drive ring 14 will face away from each other, radial to and concentric with the longitudinal axis $L_1$. Moreover, a ramped-up section 54 of the drive ring 14 will be adjacent, but slightly spaced relative to, a land section 56 of the coupling body 12. Through an interference fit, the drive ring 14 can be maintained on the coupling body 12 in the pre-installed configuration and shipped to customers, which facilitates ease of use and installation by the ultimate end-users.

To install the fitting 10 onto a pipe 16, the pipe 16 can be located within the bore 18 of the coupling body 12 while the fitting 10 is in its pre-installed configuration (FIG. 2). The drive ring 14 can then be forced axially along the longitudinal axis $L_1$ toward the flange portion 22 of the coupling body 12 until the fitting 10 assumes its installed configuration (FIG. 3). The drive ring 14 and coupling body 12 have a predetermined ratio of interference, such that axial movement of the drive ring 14 to the installed configuration causes the coupling body 12, drive ring 14, and pipe 16 to deform, thereby creating a mechanical connection of these elements with a metal-to-metal seal between the pipe 16 and coupling body 12.

More specifically, as the drive ring 14 is forced axially toward the flange portion 22, it applies a compressive force to the coupling body 12 that causes radial deformation of the body 12, forcing the tooth or teeth of its seals 30, 32, 34 to bite into the pipe 16. The coupling body 12 in turn compresses the pipe 16 first elastically (i.e., non-permanent) and then plastically (i.e., permanent). This compression is sufficiently high to plastically yield the pipe 16 under the sealing lands, forming a 360° circumferential, permanent, metal-to-metal seal between the pipe 16 and the coupling body 12. Simultaneous with the radial compression of the body 12 and the pipe 16, the drive ring 14 expands radially outward. This radial expansion of the drive ring 14 is elastic, and results in a small increase in the diameter of the drive ring 14.

Setting of a seal is considered complete (i.e., fully set) when the seal's tooth or teeth are completely forced into deforming contact with the pipe 16 (e.g., when an exterior surface 58 of the pipe 16 immediately opposite the seals 30, 32, 34 has no further radial movement as a result of being forced inward by a particular section of the drive ring 14). Alternatively, full setting of a seal(s) can be defined as when the drive ring 14 has forced the tooth or teeth of the seal furthest into the pipe 16 or when an actuating taper of the drive ring 14 levels out to a diametrically constant cylindrical section as the drive ring 14 moves past the seal.

The pipe 16 becomes strained locally in proximity to the seals 30, 32, 34 as they bite into the pipe 17. In particular, the pipe 16 typically becomes strained beyond its elastic limit as the seals 30, 32, 34 continue to bite into the surface and the pipe 16 begins to plastically deform or move radially inwardly resulting in permanent deformation. The teeth of the seals 30, 32, 34 bite into and deform the exterior surface 58 of the pipe 16 and may themselves be somewhat deformed. This functions to fill any rough or irregular surface imperfections found on the outside of the pipe 16.

Once installed, the drive ring 14 will abut or engage the flange portion 22 (although it can be spaced from flange portion 22 in other examples). Moreover, because the drive ring 14 deforms elastically during installation such that it expands radially outward, the drive ring 14 will exert a continuous elastic force against the coupling body 12 and pipe 16 that is maintained after installation through the life of the fitting 10, thereby preventing release of the metal-to-metal seal between the pipe 16 and the coupling body 12. The coupling body 12 can thereby be attached to the pipe 16 in a permanent, non-leaking manner that is compliant with industrial standards.

It is to be appreciated that the fitting 10 can comprise other configurations for mechanical attachment to a fluid element without departing from the scope of this disclosure. For instance, the coupling body 12 and drive ring 14 described above extend symmetrically about their respective central axes $X_1$, $X_2$, such that their features extend circumferentially about and concentric to their associated central axis. However, one or more of those features (e.g., the abutment surfaces 26, 52) may extend only partially about and/or asymmetric to their associated central axis. Indeed, in some examples, the coupling body 12 and/or drive ring 14 can be an irregular body with minimal or no symmetry about a central axis. For instance, the coupling body 12 can be a T-shaped or Y-shaped body having multiple legs that do not extend symmetric to a common axis. The coupling body 12 and drive ring 14 can be any body defining a bore therethrough such that the coupling body 12 can receive a fluid element and the drive ring 14 can be forced over the coupling body 12 to mechanically attach the coupling body 12 to the fluid element. Various other example fittings with coupling bodies and drive rings are described in commonly owned U.S. Pat. Nos. 10,663,093; 8,870,237; 7,575,257;

6,692,040; 6,131,964; 5,709,418; 5,305,510; and 5,110,163, which are all expressly incorporated herein by reference in their entirety.

The terms "axial", "radial", and variations thereof have been used above in describing various features of the coupling body 12, drive ring 14, and pipe 16. It is to be appreciated that those terms as used above (and further below) are relative to the central axis of the element being described unless clearly indicated otherwise. For example, the terms "axial", "radial", and variations thereof when describing features of the coupling body 12 are relative to the coupling body's central axis $X_1$, when describing features of the drive ring 14 are relative to the drive ring's central axis $X_2$, and when describing features of the pipe 16 are relative to the pipe's central axis, unless clearly indicated otherwise. Moreover, it is understood that in configurations wherein the central axes of the coupling body 12, drive ring 14, and pipe 16 are collinear with each other and a common axis (see e.g., FIGS. 1-3), the terms "axial", "radial", and variations thereof when describing features of the coupling body 12, drive ring 14, and pipe 16 will similarly be relative to the common axis and all central axes of the coupling body 12, drive ring 14, and pipe 16.

Figure 4:
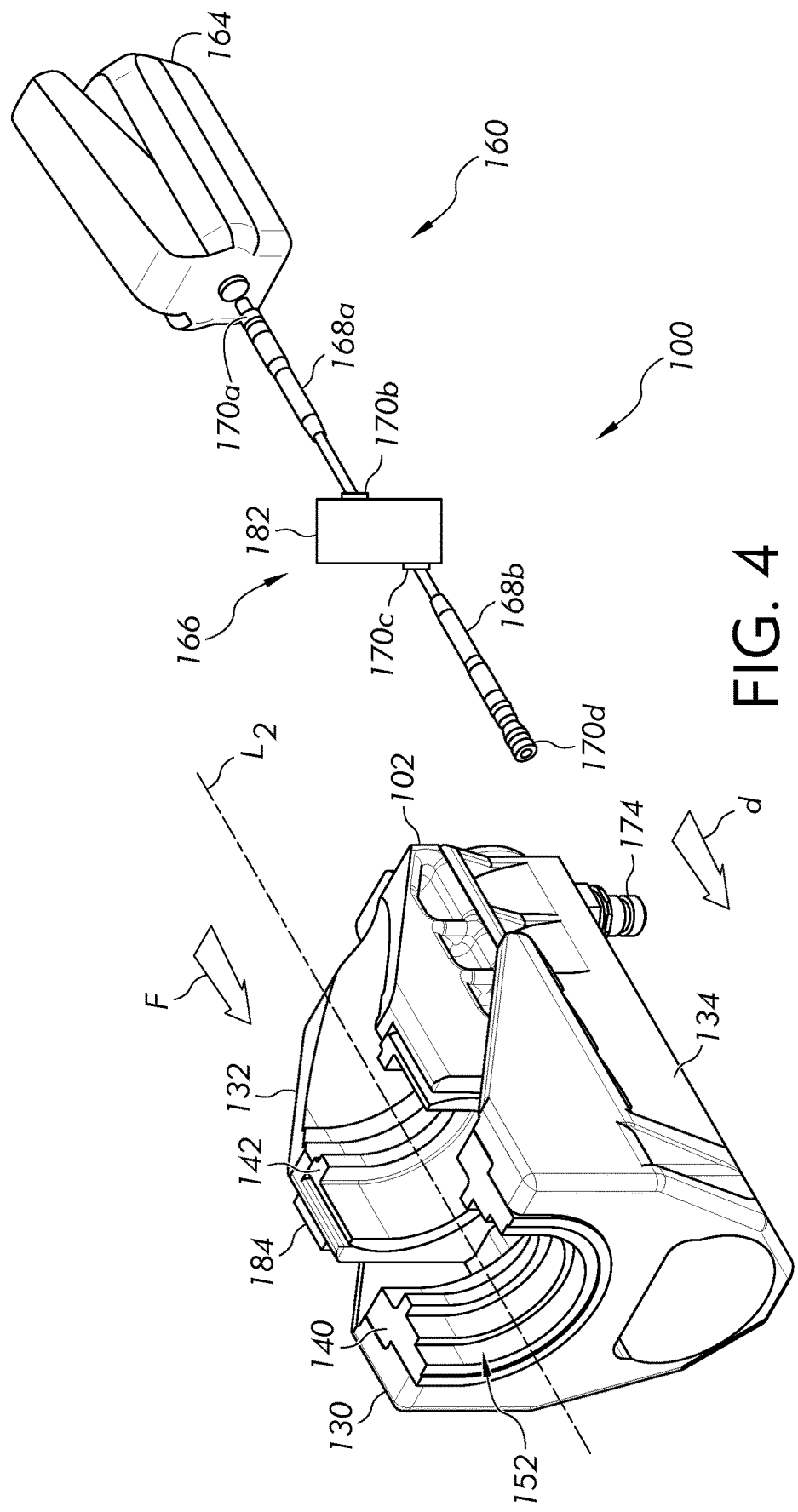
FIG. 4 is a schematic perspective view of an example installation apparatus for installing the fluid fitting.

Turning to FIG. 4, an installation apparatus 100 is illustrated having a tool mechanism 102 that can be operated to connect the fitting 10 and pipe 16 as described above, although it is understood that the tool mechanism 102 could be useful for connecting other fittings and fluid elements. More particularly, the tool mechanism 102 can be operated to axially move or advance the drive ring 14 over the coupling body 12 of the fitting 10 while the pipe 16 is within the coupling body 12 to compress or plastically deform the coupling body 12 radially against the exterior surface 58 of the pipe 16 and provide the sealed mechanical connection between the coupling body 12 and pipe 16.

Figure 5:
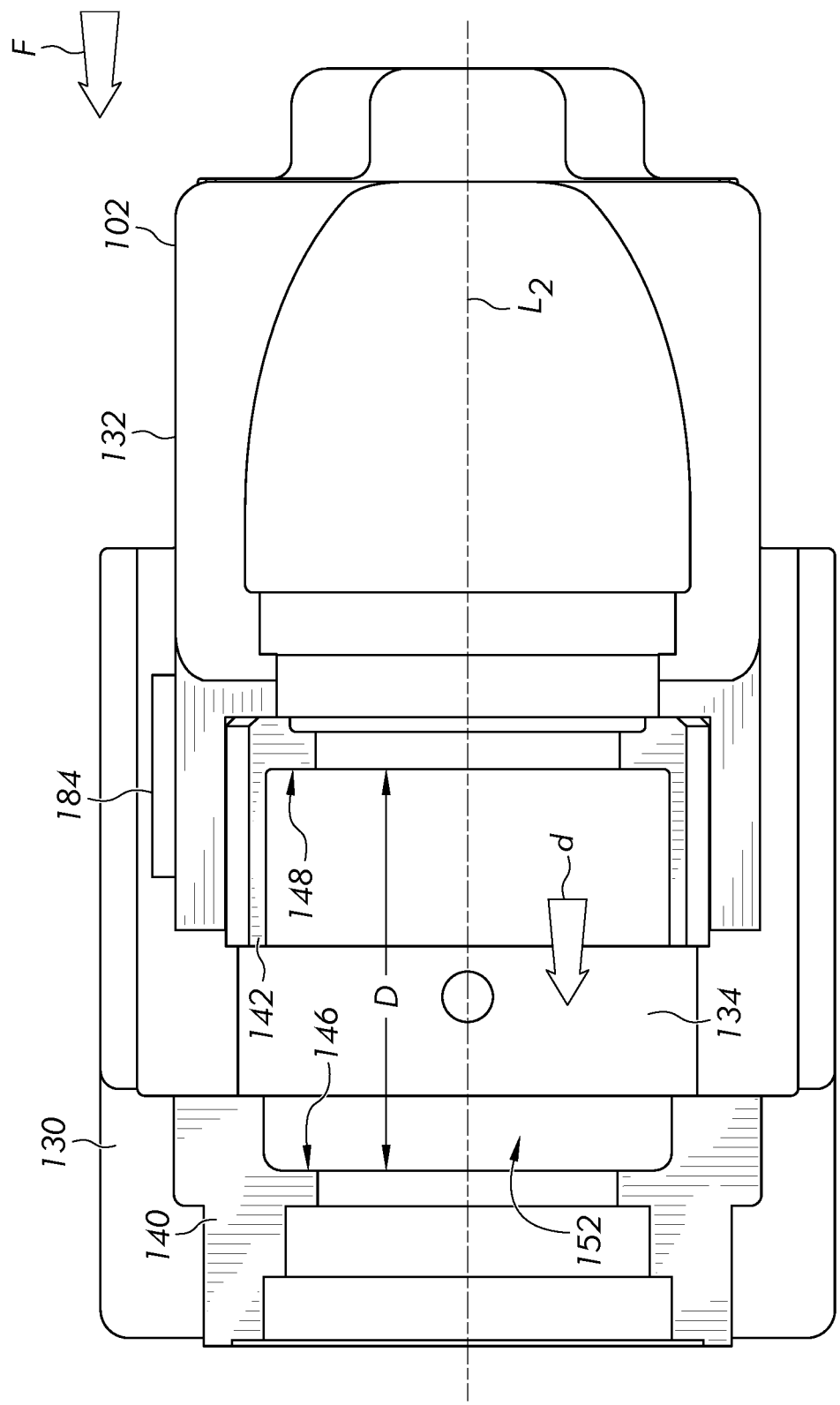
FIG. 5 is a top view of a tool mechanism of the installation apparatus.

FIG. 5 shows a top view of the tool mechanism 102 in further detail, which includes a first body 130 and a second body 132 that are movable relative to each other. In particular, the first body 130 is a stationary body having a base portion 134 that slidably supports the second body 132 such that the second body 132 is movable in a linear manner along a longitudinal axis $L_2$ of the tool mechanism 102. The tool mechanism 102 can further include one or more adapters that are coupled to the first body 130 and/or second body 132. For instance, the tool mechanism 102 in the present embodiment includes a first adapter 140 that is coupled to the first body 130 and a second adapter 142 that is coupled to the second body 132 such that the second adapter 142 is movable with the second body 132 relative to the first body 130 and first adapter 140.

The tool mechanism 102 further includes a first abutment surface 146 and a second abutment surface 148 that face each other and are separated by a distance D. In the present embodiment, the first abutment surface 146 is defined by the first adapter 140 and comprises a semi-annular surface that extends radial to the longitudinal axis $L_2$, while the second abutment surface 148 is defined by the second adapter 142 and similarly comprises a semi-annular surface that extends radial to the longitudinal axis $L_2$. Moreover, the first and second abutment surfaces 146, 148 are both concentric with longitudinal axis $L_2$. However, the first and second abutment surfaces 146, 148 can be defined by other portions such as the first and second bodies 130, 132, respectively. Moreover, the first and second abutment surfaces 146, 148 can comprise other shapes or orientations, and may not be concentric with the the longitudinal axis $L_2$ in some examples.

The first and second abutment surfaces 146, 148 are movable relative to each other since they are respectively carried by the first and second bodies 130, 132. That is, movement of the second body 132 along the longitudinal axis $L_2$ will cause the second abutment surface 146 to similarly move along the longitudinal axis $L_2$ relative to the first abutment surface 148. Thus, the distance D between the first and second abutment surfaces 146, 148 can be adjusted by moving the first and second bodies 130, 132 relative to each other along the longitudinal axis $L_2$.

The tool mechanism 102 defines a channel 152 that can receive the fluid fitting 10 described above in its pre-installed configuration. In particular, the fluid fitting 10 can be nested within the channel 152 such that the longitudinal axes $L_1$, $L_2$ of the fitting 10 and tool mechanism 102 are collinear. Moreover, the abutment surfaces 26, 52 of the coupling body 12 and drive ring 14 can be located between the first and second abutment surfaces 146, 148 of the tool mechanism 102 such that the abutment surfaces 26, 52 of the coupling body 12 and drive ring 14 respectively face the first and second abutment surfaces 146, 148 of the tool mechanism 102.

The tool mechanism 102 can then be operated to move the second body 132 along the longitudinal axial $L_2$ toward the first body 130, in turn causing the second abutment surface 148 to move towards the first abutment surface 146. Eventually, both abutment surfaces 146, 148 will respectively abut the abutment surfaces 26, 52 of the coupling body 12 and drive ring 14. Moreover, further movement of the second abutment surface 148 towards the first abutment surface 146 will axially force the drive ring 14 along the longitudinal axes $L_1$, $L_2$ toward the flange portion 22 of the coupling body 12, eventually assuming the installed configuration show in FIG. 3.

Accordingly, the tool mechanism 102 can be operated to connect the fitting 10 to the pipe 16 as described above, thereby creating a mechanical connection of these elements with a metal-to-metal seal between the pipe 16 and coupling body 12. That is, movement of the second abutment surface 148 towards the first abutment surface 146 will axially force the drive ring 14 along the longitudinal axis $L_1$ toward the flange portion 22 of the coupling body 12. As the drive ring 14 is forced axially toward the flange portion 22, it will apply a compressive force to the coupling body 12 that causes radial deformation of the body 12, forcing the tooth or teeth of its seals 30, 32, 34 to bite into the pipe 16. The coupling body 12 will in turn compress the pipe 16 first elastically (i.e., non-permanent) and then plastically (i.e., permanent), eventually forming a 360° circumferential, permanent, metal-to-metal seal between the pipe 16 and the coupling body 12. Simultaneous with the radial compression of the body 12 and the pipe 16, the drive ring 14 will elastically expand radially outward. Thus, once installed, the drive ring 14 will exert a continuous elastic force against the coupling body 12 and pipe 16 that is maintained through the life of the fitting 10, thereby preventing release of the metal-to-metal seal between the pipe 16 and the coupling body 12.

It is to be appreciated that the tool mechanism 102 can be configured to install additional or alternative fittings than the fitting 10 described above. For instance, in some examples, the first and/or second adapters 140, 142 can be removed from the tool mechanism 102 so that it can accommodate a fitting with a larger coupling body and/or drive ring. In such cases, the first and/or second bodies 130, 132 themselves can define abutment surfaces for engagement with the coupling body and/or drive ring. In other examples, the first and/or second adapters 140, 142 can be removed and replaced with a different adapter to accommodate a different fitting. Broadly speaking, the tool mechanism 102 can be any mechanism having two abutment surfaces that are movable relative to each other such that the mechanism can be operated to connect a fluid fitting to a pipe. Various example toll mechanisms are described in U.S. Pat. Nos. 4,189,817; 5,305,510; 5,694,670; 6,434,808; and 9,278,441, which are all expressly incorporated herein by reference in their entirety.

Turning back to FIG. 4, the installation apparatus 100 can include a drive assembly 160 that is operable to apply a driving force to the tool mechanism 102 to move the first and second bodies 130, 132 relative to each other as described above. In the present example, the drive assembly 160 includes a hydraulic source 164 that is remotely positioned from the tool mechanism 102, and a hose assembly 166 that fluidly connects the hydraulic source 164 to the tool mechanism 102.

The hydraulic source 164 is a hydraulic pump that is configured to supply a pressurized, hydraulic fluid. The hydraulic source 164 can be driven by a manual actuator, a gas engine, or an electric motor. Moreover, the hose assembly 166 includes a plurality of hoses 168*a*, 168*b* and connectors 170*a-d* that are fluidly coupled in series to form a fluid channel that conveys the pressurized, hydraulic fluid from the hydraulic source 164 to the tool mechanism 102. In particular, the connector 170*a* is connected directly to an outlet of the hydraulic source 164, while the connector 170*d* is connected directly to an input port 174 of the tool mechanism 102. Furthermore, conventional male/female quick disconnects are provided as the connectors 170*a-d*, for making readily disconnectable fluid connections with their mating components.

In operation, the drive assembly 160 will deliver the hydraulic fluid to a hydraulic cylinder (not shown) of the tool mechanism 102, which in turn will exert a corresponding linear force F against the second body 132. That force F will move the second body 132 along the longitudinal axis $L_2$ toward the first body 130 as described above, so long as it is greater than any total counter force being exerted against the second body 132 in the axial direction (e.g., a counter force being generated by the drive ring 14, friction, or other elements).

However, the drive assembly 160 can include various other structure for providing a driving force to the tool mechanism 102. For instance, the tool mechanism 102 may require more than one input of hydraulic fluid. In such cases, the hose assembly 166 can deliver hydraulic fluid to a manifold, which distributes hydraulic fluid to multiple input ports on the tool mechanism 102. In other examples, the hydraulic source 164 may be directly connected to the tool mechanism 102 without any intermediate hose assembly. Still further, the drive assembly 160 can use electro-mechanical means of applying force to the tool mechanism 102 without any use of a hydraulic fluid. Broadly speaking, the drive assembly 160 can comprise any conventional means that is operable to apply force to an object (e.g., the second body 132) in order to move it linearly.

As described below, the installation apparatus 100 can further include a diagnostic system that is configured to detect one or more properties of the installation apparatus 100 or fluid fitting 10 during installation and determine a quality of the attachment between the fluid fitting 10 and the pipe 16 based on the one or more detected properties.

More specifically, the diagnostic system can include one or more sensors that are each configured to detect an associated property of the installation apparatus 100 or fluid fitting 10 and provide an output corresponding to the detected output. For example, the diagnostic system can include a first sensor 182 (shown schematically in FIG. 4) that is configured to detect a force property of the installation apparatus 100 or fluid fitting 10 and provide an output corresponding to the force property (for the purposes of this disclosure, a "force property" of an object refers to a force being applied by or to the object, either in absolute terms or per unit area). The sensor 182 in the present embodiment is a pressure sensor that is connected in line with the hoses 168*a*, 168*b* of the hose assembly 166 (via connectors 170*c*, 170*d*) such that it can detect a pressure of the hydraulic fluid being delivered to the tool mechanism 102 and provide an electrical output (e.g., voltage or radio frequency output) corresponding to the detected pressure. It is understood that the pressure detected by the sensor 182 (and its output) will correspond to the linear force F that is ultimately exerted on the second body 132 of the tool mechanism 102, since that force F can be extrapolated knowing either of those values and how the hydraulic pressure is transferred to the second body 132 as linear force. However, the sensor 182 can comprise other means for detecting a force property of the installation apparatus 100. For example, the sensor 182 can be load cell that is configured to directly measure the linear force F.

The diagnostic system can further include a second sensor 184 (shown schematically in FIGS. 4 & 5) that is configured to detect a spatial property of the installation apparatus 100 or fluid fitting 10 and provide an output corresponding to the spatial property (for the purposes of this disclosure, a "spatial property" of an object refers to a specific location of the object or a distance that the object travels). The sensor 184 in the present embodiment is an electrically operated sensor in the form of a linear transducer that is configured to detect a distance d that the second body 132 (and second abutment surface 148 coupled thereto) moves from an initial position, and provide an electrical output (e.g., voltage or radio frequency output) corresponding to the detected distance d. It is understood that the distance d detected by the sensor 184 (and its output) will correspond to the distance D between the first and second abutment surfaces 146, 148, since the distance D can be extrapolated knowing either of those values and the initial position of the second body 132 relative to the first body 130.

However, the second sensor 184 can comprise other means for detecting a spatial property of the installation apparatus 100 or fluid fitting 10. For example, the sensor 184 can be a proximity sensor that detects when a portion of the second body 132 (e.g., the second abutment surface 148) arrives at a particular location. As another example, the sensor 184 can be a device that directly detects the distance D between the first and second abutment surfaces 146, 148. As yet another example, the sensor 184 can be a device that directly detects a distance that the drive ring 14 of the fluid fitting 10 moves.

Optionally, the diagnostic system can further include a third sensor 186 (shown schematically in FIGS. 1-3) that is configured to detect a strain property of the installation apparatus 100 or fluid fitting 10 and provide an output corresponding to the strain property. For instance, the sensor 186 in the present embodiment is an electrically operated strain gauge that is configured to detect strain in a portion of the fitting 10 and produce an electrical output (e.g., voltage or radio frequency output) corresponding to the detected strain. Specifically, the sensor 186 is fixed to the exterior surface 50 of the drive ring 14 and is configured to detect strain that is present in the drive ring 14. As discussed above, the drive ring 14 will expand radially during installation, thereby generating strain in the drive ring 14 that can be measured by the sensor 186. This detectable strain is directly related to the deformation of the body 12 and/or pipe 16. Depending upon the strain gauge used, and the orientation of its strain sensing element, the detected physical strain of the drive ring 14 can be any of circumferential strain or hoop strain, axial strain, or radial strain. It is further contemplated that combinations of these can be detected.

The third sensor 186 can be applied at various locations along the longitudinal axis $L_1$ of the fluid fitting 10 (i.e., body 12, drive ring 14). It is preferable for the sensor 186 to be located at a region that experiences relatively high strain at the installed configuration, or at potential failure points. In many cases, such a location can be found near or in alignment with one of the main seal 30, inboard seal 32, and/or outboard seal 34. For example, the physical strain in the material of the drive ring 14, due to its elastic expansion during installation, is relatively high in the position over the location of the main seal 30 because this is a location of high deformation of the coupling body 12 and pipe 16. Thus, the sensor 186 can be located generally in radial alignment with at least one of the seals 30, 32, 34, such as the main seal 30, relative to the longitudinal axis $X_1$ of the fitting 10. However, it is contemplated that the third sensor 186 can be affixed to various other parts of the fitting 10, interior or exterior, including the body 12 or pipe 16. Moreover, the sensor 186 can correspond to any of the example sensors described in U.S. Pat. No. 10,663,093.

The sensors 182, 184, 186 above can be configured to detect other types of properties than those described above, such as acceleration, vibration, temperature, etc. Moreover, the detected properties can be properties of the fitting 10 or installation apparatus 100. For instance, in one example, the third sensor 186 can be configured to detect a strain property of the installation tool 102 instead of the fitting 10, and may be positioned on a portion of the installation tool 102, for example on either or both of the first body 130 or second body 132.

Furthermore, the diagnostic system may include additional and/or alternative sensors that are configured to detect additional and/or alternative properties. For instance, any or all of the sensors 182, 184, 186 described above can be used alone or in various combinations with each other and/or other sensors. Broadly speaking, the diagnostic system can include any configuration of one or more sensors, wherein each sensor is configured to detect a property of the installation apparatus 100 or fluid fitting 10 and provide a corresponding output.

Figure 6:
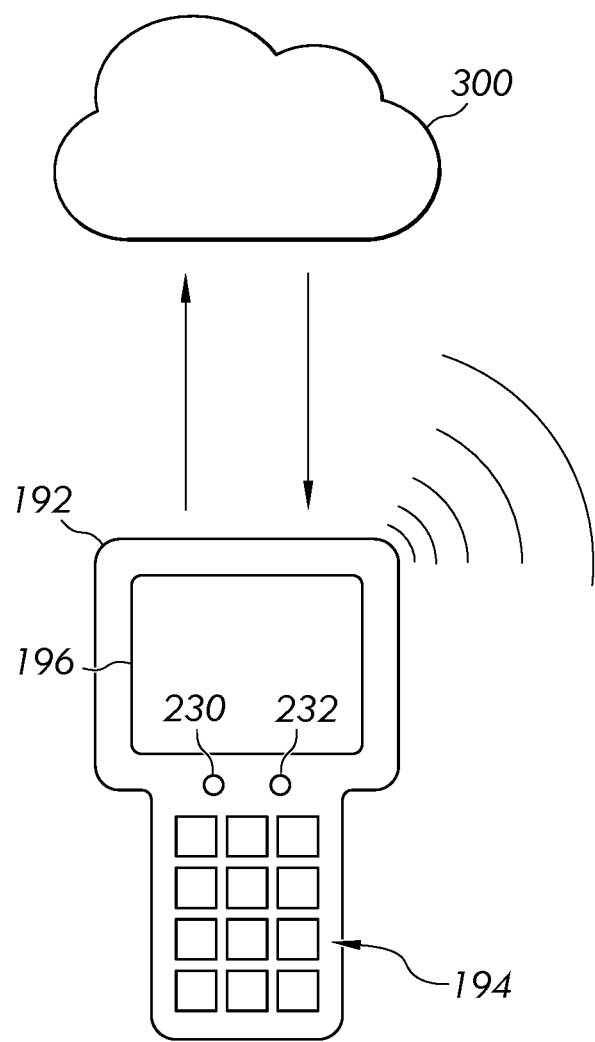
FIG. 6 is a schematic view of a processing unit of the installation apparatus.

Turning to FIG. 6, the diagnostic system can further include a processing unit 192 that can acquire the outputs of sensors 182, 184, 186 and generate one or more resulting data sets for comparison with one or more predetermined data sets to determine a quality of the attachment between the fluid fitting 10 and the pipe 16.

More specifically, the processing unit 192 in the present embodiment is a handheld unit having a user interface 194 and display 196. Each sensor 182, 184, 186 can be in electrical communication with the processing unit 192 via an electronic wire or cable (e.g., a USB cable). Alternatively, communication between the processing unit 192 and one or more sensors 182, 184, 186 may be established wirelessly. For instance, one or more sensors 182, 184, 186 can include an RFID tag that is configured to transmit an RF signal corresponding to its detected property. The RFID tag typically includes an antenna that transmits RF signals relating to the identification and/or information stored within the RFID tag. The processing unit 192 can provide power to the RFID tag, in whole or in part, whereby a wireless communication transceiver of the RFID tag is passively powered by an electromagnetic field from the processing unit 192. The processing unit 192 can be configured to probe or interrogate the RFID tag, and can include a transmitter and receiver for exchanging RFID information with the RFID tag wirelessly. Optionally, the processing unit 192 can be in wireless communication with the one or more sensors 182, 184, 186 via other wireless data communication protocols, such as any of Wifi, Bluetooth, NFC, cellular (analog or digital, including all past or present iterations), etc.

Figure 7:
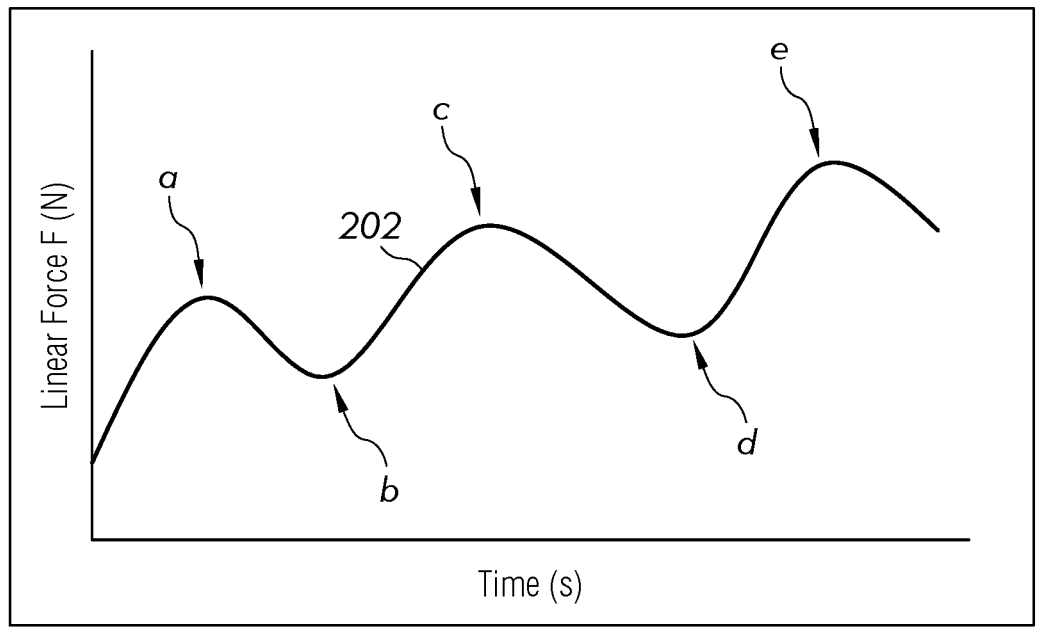
FIG. 7 is a graphical depiction of an example first data set.

While installing the fitting 10 with the tool mechanism 102 as described above, the processing unit 192 can be configured to acquire the output from the first sensor 182 at discrete times to generate a first data set 202 (see FIG. 7) corresponding to the sensor's detected property over time. The X-axis in FIG. 7 represents a specified time interval during operation of the tool mechanism 102 and the Y-axis represents the linear force F applied to the second body 132 applied to during the time interval (it is understood that the linear force F corresponds to the pressure detected by the sensor 182, as discussed above, or other linear force data that is ultimately exerted on the second body 132 obtained by an alternative variation of sensor 182).

The first data set 202 includes various crests and troughs which correlate to specific moments as the drive ring 14 traverses over and interacts with the coupling body 12. Specifically, crest "a" occurs as a result of the outboard seal 34 of the coupling body 12 engaging and biting into the pipe 16, since this is the first seal that is compressed by operation of the drive ring. As the drive ring 14 is forced over the coupling body 12 by the second abutment surface 148 of the tool mechanism 102, the outboard seal 34 will engage and press against the pipe 16, thereby requiring an increase in linear force F to continue moving the drive ring 14 over the coupling body 12. The linear force F will thus increase until the pipe 16 yields to compression by the outboard seal 34, at which point the linear force F required for further movement of the drive ring 14 will decrease. This fluctuation of linear force F corresponds to crest "a".

The linear force F will continue to decrease until the next seal is compressed, which in this example is the main seal 30 of the coupling body 12 that engages and presses against the pipe 16, thereby requiring another increase in linear force F to continue moving the drive ring 14 over the coupling body 12. This fluctuation of linear force F corresponds to trough "b". The linear force F will continue to increase until the pipe 16 yields to compression by the main seal 30, at which point the linear force F required for further movement of the drive ring 14 will decrease. This fluctuation of linear force F corresponds to crest "c".

Again, the linear force F will continue to decrease until the next seal is compressed, which in this example is the inboard seal 32 of the coupling body 12 that engages and presses against the pipe 16, thereby requiring another increase in linear force F to continue moving the drive ring 14 over the coupling body 12. This fluctuation of linear force F corresponds to trough "d". The linear force F will continue to increase until the pipe 16 yields to compression by the inboard seal 32, at which point the linear force F required for further movement of the drive ring 14 will decrease. This fluctuation of linear force F corresponds to crest "e".

Figure 8:
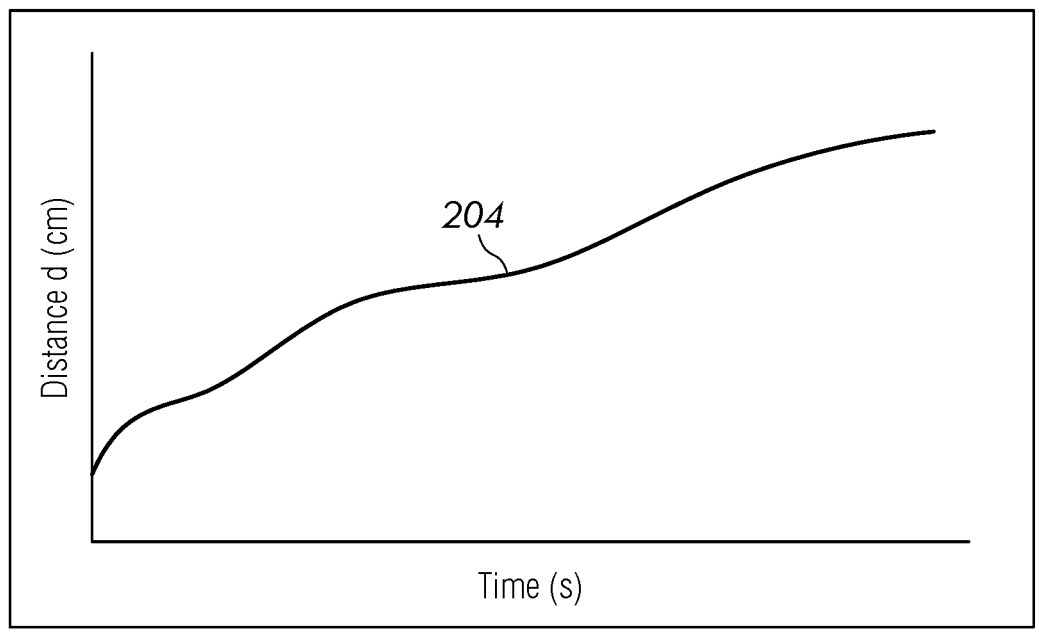
FIG. 8 is a graphical depiction of an example second data set.

During installation, the processing unit 192 can be further configured to acquire the output from the second sensor 184 (corresponding to a spatial property of the tool mechanism 102) at the same discrete times in which the output from the first sensor 182 was acquired. The processing unit 192 will then generate a second data set 204 (see FIG. 8) corresponding to the detected property of the second sensor 184 over those same discrete times. The X-axis in FIG. 8 represents a specified time interval during operation of the tool mechanism 102 and the Y-axis represents the distance d that the second body 132 (and second abutment surface 148 coupled thereto) moves to during the time interval.

Figure 9:
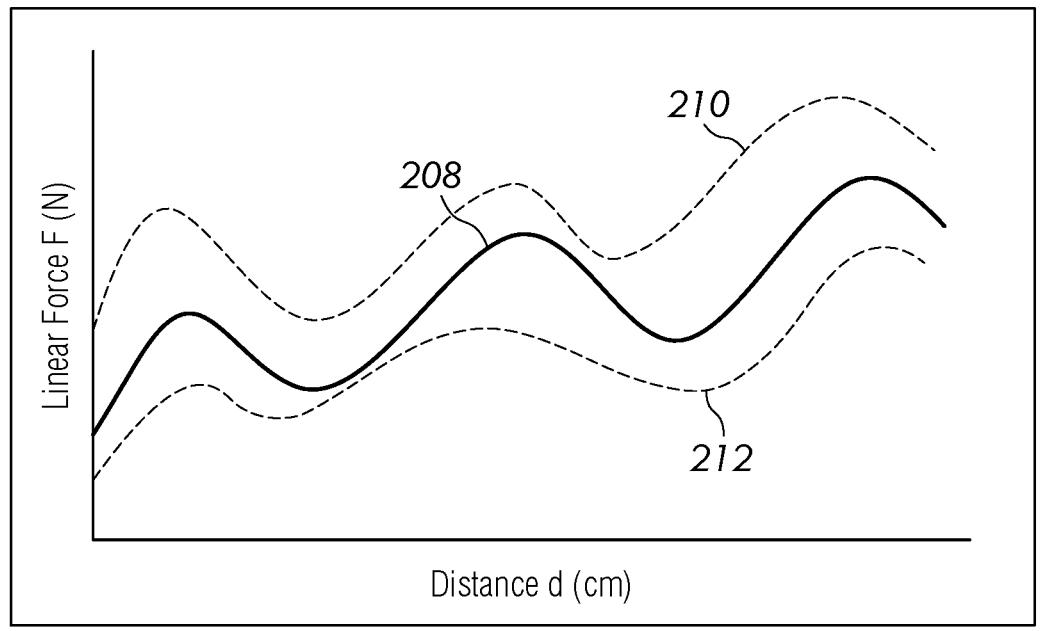
FIG. 9 is a graphical depiction of a resulting data set that is generated based on the first and second data sets in FIGS. 7 & 8.

After the processing unit 192 creates the first and second data sets 202, 204, the processing unit 192 can be further configured to correlate the first and second data sets 202, 204 with respect to their discrete times to generate a resulting data set 208 (see FIG. 9) that corresponds to the first property detected by the first sensor 182 versus the second property detected by the sensor 184. The X-axis in FIG. 9 represents the distance d that the second body 132 (and second abutment surface 148 coupled thereto) moves to during the time interval, and the Y-axis represents the linear force F applied to the second body 132 applied during the movement (it is understood that the linear force F corresponds to the pressure detected by the first sensor 182, as discussed above).

In some examples, the processing unit 192 can store a predetermined data set that can then be compared against the resulting data set 208 to determine if resulting data set 208 is compliant. More specifically, as shown in FIG. 9, the predetermined data set can include a maximum data set 210 and a minimum data set 212 respectively corresponding to a maximum first property (e.g., linear force F) per second property (e.g., distance d) for the installation apparatus 100 and a minimum first property per second property. In other words, the maximum and minimum data sets 210, 212 represent upper and lower limits for the resulting data set 208 that would yield a proper installation of the fitting 10. The limits can be predetermined based on known properties for the fitting 10 and pipe 16 (e.g., materials, dimensions, etc.) and/or experimental data.

Figure 10:
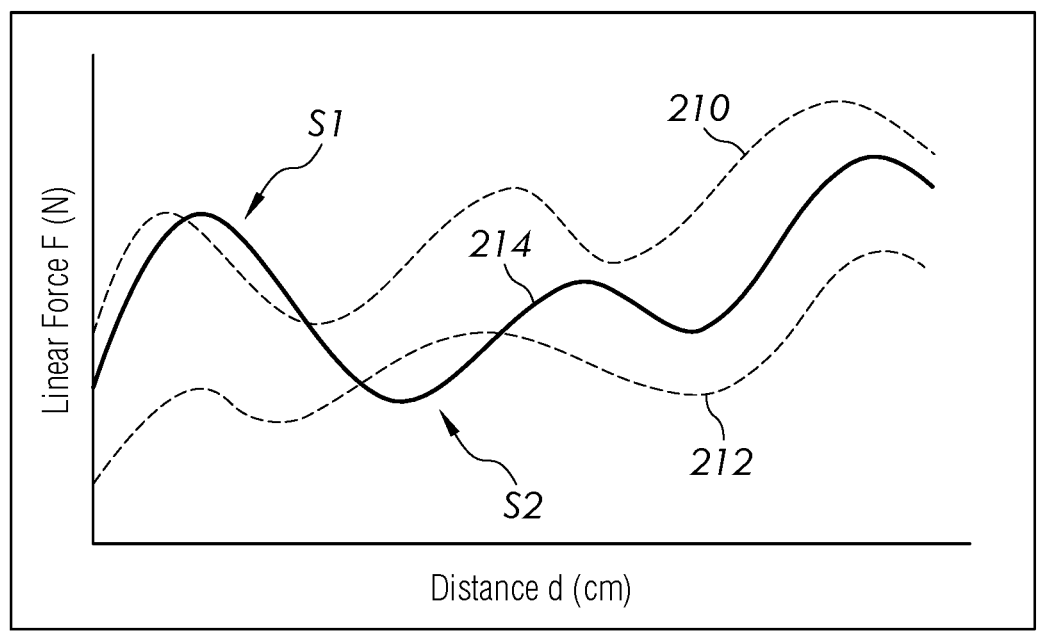
FIG. 10 is a graphical depiction of another resulting data set for comparison with the resulting data set shown in FIG. 9.

Accordingly, the processing unit 192 can determine if the fitting 10 has been installed properly by determining if the resulting data set 208 is between or equal to the maximum data set 210 and minimum data set 212. As can be seen in FIG. 9, the resulting data set 208 is between the maximum and minimum data sets 210, 212, indicating that the fitting 10 has been installed properly. By contrast, FIG. 10 shows a comparative resulting data set 214 having segments S1, S2 that fall outside of the acceptable limits, indicating a possible failure in the installation process. Moreover, the specific locations in which the resulting data set 214 fall outside of the acceptable limits can provide further indication of the specific type of failure.

In some examples, the processing unit 192 can be configured to correlate the second data set 204 (corresponding to a spatial property of the tool mechanism 102 over time) with other properties of the fitting 10 or tool mechanism 102 as an alternative or redundant means of determining whether the fitting 10 has been installed correctly. For instance, in some examples, the processing unit 192 can be configured to acquire the output from the third sensor 186 (corresponding to a strain property of the fitting 10) at the same discrete times in which the output from the second sensor 184 was acquired. The processing unit 192 will then generate a third data set 216 (see FIG. 11) corresponding to the strain property over those same discrete times. The X-axis in FIG. 11 represents a specified time interval and the Y-axis represents the strain detected by the sensor 186 during the time interval.

Figure 11:
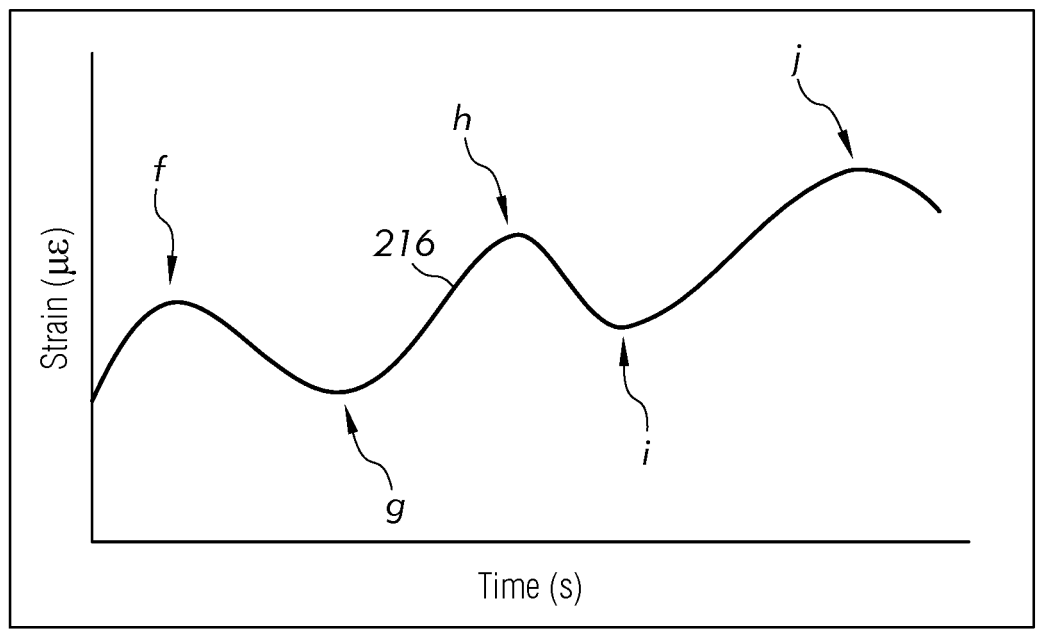
FIG. 11 is a graphical depiction of an example third data set.

The third data set 216 in FIG. 11 similarly includes various changes in slope which correlate to specific moments as the drive ring 14 traverses over and interacts with the coupling body 12. Specifically, crest "f" occurs as a result of the outboard seal 34 of the coupling body 12 engaging and biting into the pipe 16. As the drive ring 14 is forced over the coupling body 12 by the second abutment surface 148 of the tool mechanism 102, the outboard seal 34 will engage and press against the pipe 16, thereby increasing strain in the fitting 10. The strain will increase until the pipe 16 yields to compression by the outboard seal 34, at which point the strain will decrease. This fluctuation of strain corresponds to crest "f".

The strain in the fitting 10 will continue to decrease as the drive ring 14 moves over the coupling body 12 until the main seal 30 of the coupling body 12 engages and presses against the pipe 16, again causing strain in the fitting 10 to increase. This fluctuation of strain corresponds to trough "g". The strain will continue to increase until the pipe 16 yields to compression by the main seal 30, at which point the strain will decrease. This fluctuation of strain corresponds to crest "h".

Again, the strain in the fitting 10 will continue to decrease as the drive ring 14 moves over the coupling body 12 until the inboard seal 32 of the coupling body 12 engages and presses against the pipe 16, causing strain in the fitting 10 to increase. This fluctuation of strain corresponds to trough "i". The strain will continue to increase until the pipe 16 yields to compression by the inboard seal 32, at which point the strain will decrease. This fluctuation of strain corresponds to crest "j".

Figure 12:
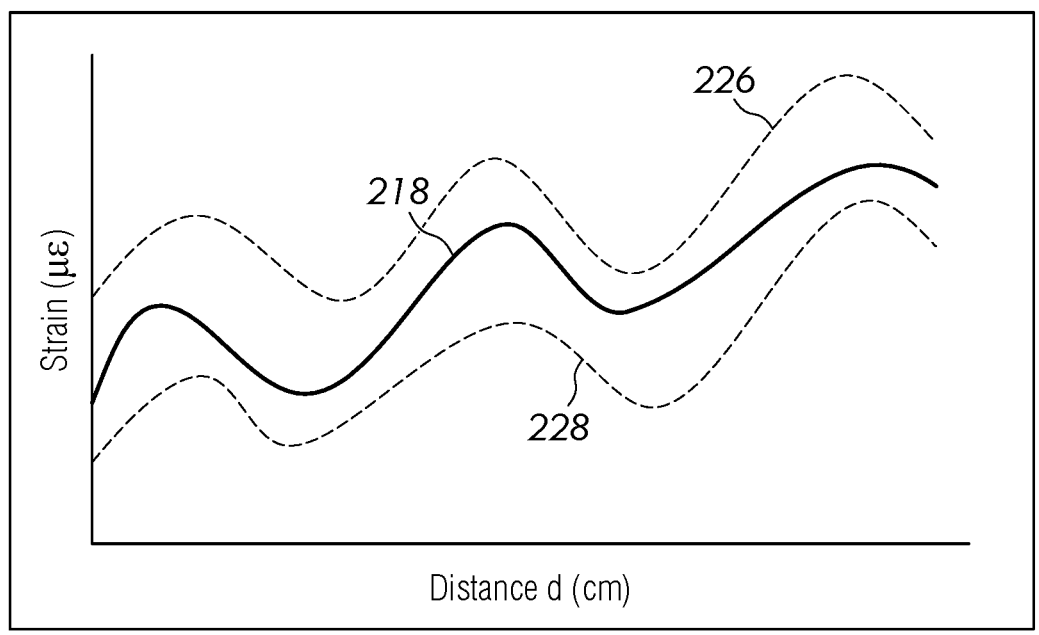
FIG. 12 is a graphical depiction of another resulting data set that is generated based on the second and third data sets shown in FIGS. 8 & 11.

After the processing unit 192 creates the second and third data sets 204, 216, the processing unit 192 can be configured to correlate the second and third data sets 204, 216 with respect to their discrete times to generate a resulting data set 218 (see FIG. 12) that corresponds to the second property detected by the second sensor 184 versus the third property detected by the third sensor 186. The X-axis in FIG. 12 represents the distance d that the second body 132 (and second abutment surface 148 coupled thereto) moves to during the time interval, and the Y-axis represents the strain experienced by the fitting 10 during the movement.

The processing unit 192 can similarly store a predetermined data set that can then be compared against the resulting data set 218 to determine if resulting data set 218 is compliant. More specifically, as shown in FIG. 12, the predetermined data set can include a maximum data set 226 and a minimum data set 228 respectively corresponding to a maximum third property (e.g., strain) per second property (e.g., distance d) and a minimum third property per second property. In other words, the maximum and minimum data sets 226, 228 represent upper and lower limits for the resulting data set 218 that would yield a proper installation of the fitting 10. The limits can be predetermined based on known properties for the fitting 10 and pipe 16 (e.g., materials, dimensions, etc.) and/or experimental data.

Accordingly, the processing unit 192 can determine if the fitting 10 has been installed properly by determining if the resulting data set 218 is between or equal to the maximum data set 226 and minimum data set 228. As can be seen in FIG. 12, the resulting data set 218 is between the maximum and minimum data sets 226, 228, indicating that the fitting 10 has been installed properly. Although not shown in FIG. 12, the processing unit 192 could likewise determine a failure of the installation process if resulting data set 218 has any segments that fall outside of the acceptable limits (i.e., data sets 210, 212).

Although the data sets 202, 204, 208, 210, 212, 214, 216, 218, 226, 228 described above have been illustrated in FIGS. 7-12 in graphical form, it is to be appreciated that the data sets can be represented in other forms such as, for example, tabular.

In some examples, the processing unit 192 can include one or more output devices (e.g., speakers, lights, the display 196, etc.) that can be electrically operated to provide an output (e.g., sound output, indicator light, video image, electrical signal, vibration, etc.) based on compliance of one or both of the resulting data sets 208, 218 with their respective maximum and minimum data sets, thereby indicating whether the fitting 10 has been installed correctly.

For example, the processing unit 192 (see FIG. 6) can include first and second indicator lights 230, 232. The processing unit 192 can be configured to illuminate the first indicator light 230 (e.g., green) if the resulting data set 208 is compliant with the maximum and minimum data sets 210, 212, thereby indicating that the fitting 10 was installed correctly. Moreover, the processing unit 192 can be configured to illuminate the second indicator light 232 (e.g., red) if the resulting data set 208 is not compliant, thereby indicating that the fitting 10 was not installed correctly. It is understood that the indicator light 230 when unlit can thereby indicate that the resulting data set 208 is not compliant, while the indicator light 232 when unlit can thereby indicate that the resulting data set 208 is compliant. It is further contemplated that compliant or non-compliant notices could also be presented on other output devices (e.g., speakers, lights, the display 196, etc.).

In another example, the processing unit 192 can be configured to illuminate the indicator light 230 if the resulting data set 218 is compliant with the maximum and minimum data sets 226, 228, or illuminate the indicator light 232 if the resulting data set 218 is not compliant. It is understood that the indicator light 230 when unlit can thereby indicate that the resulting data set 218 is not compliant, while the indicator light 232 when unlit can thereby indicate that the resulting data set 218 is compliant.

As a further example, the processing unit 192 can be configured to illuminate the indicator light 230 if both of the resulting data sets 208, 218 are compliant with the their respective maximum and minimum data sets, or illuminate the indicator light 232 if at least one of the resulting data sets 208, 218 is not compliant with its respective maximum and minimum data sets. It is understood that the indicator light 230 when unlit can thereby indicate that at least one of the resulting data sets 208, 218 is not compliant, while the indicator light 232 when unlit can thereby indicate that both of the resulting data sets 208, 218 are compliant.

The processing unit 192 can include any number and configuration of output devices that can be electrically operated to provide one or more outputs based on compliance of one or both of the resulting data sets 208, 218 with their respective maximum and minimum data sets.

In certain embodiments, the processing unit 192 may be integrated with a computer system. The processing unit 192 preferably has on-board non-transient computer memory to store the data sets 202, 204, 208, 210, 212, 214, 216, 218, 226, 228 described above for later retrieval, analysis, or transmission. Additionally, the processing unit 192 preferably is capable of communication on a local network (LAN) or wide-area network (WAN), including the internet and world-wide web. Preferably, the processing unit 192 itself is capable of wireless data communication, such as via Wifi, Bluetooth, NFC, cellular (analog or digital, including all past or present iterations), or other similar techniques.

Further, the processing unit 192 preferably has a programmable microprocessor that can include various features and capabilities. For example, the microprocessor includes a programmable computing core that is capable of executing any or all of the processing steps described above, including generating, storing, and comparing the data sets 202, 204, 208, 210, 212, 214, 216, 218, 226, 228 as described above. The programmable computing core can be capable of performing any or all of processing commands, making calculations, tracking/reading data, storing data, analyzing data, adjusting/manipulating data, receiving new commands or instructions, etc.

In some examples, the diagnostic system can include an additional or alternative processing unit in the form of a remote database 300 (see FIG. 6), which can receive data from the processing unit 192 and/or sensors 182, 184, 186 for storage and/or performing one or more of the diagnostic procedures described above (e.g., generating data sets, comparing data sets, and/or providing an output indicating compliance of a data set). The remote database 300 may be a remote central computer server database (e.g., a network-connected or internet-connected computer, sometimes referred to as "in the cloud") that is local to the site of the field installation or the controlling company, local to the manufacturer of the fitting, and/or "cloud-based" in that it is maintained at a remote, internet-connected server. Such a "cloud-based" internet-connected server could provide data storage and retrieval capabilities, and/or may further provide computational capabilities to transform, analyze, and/or report upon the cataloged data. Regardless of location, this database 300 can be maintained by the manufacturer of the fitting 10, by a service company that inspects the fitting 10, and/or by the end user of the fitting 10 for use by the associated quality assurance personnel. The data obtained from the processing unit 192 and/or sensors 182, 184, 186 can be catalogued over time to help both the manufacturer and end customer track performance of the fitting 10 and installation tool 102 for purposes of installation help, maintenance, replacement, warranty claims, etc.

In one example, data from the third sensor 186 described above can be captured at the time that the fitting 10 is installed upon the pipe 16 (immediately before, during, and/or after). This reading can provide a baseline reference for the state of the drive ring 14 at the ambient environment where it will be installed (although, installation could also be performed at the manufacturer or other location). It can be especially useful to store the installation sensor readings to the remote database 300 for future use.

In this manner, both the manufacturer and the end-user can keep track of and otherwise understand the performance of the fitting 10 in the field so that all parties involved have a high degree of confidence that the fitting 10 will perform to its specifications. Alternatively, if the sensed readings indicate that the fitting installation trended out of specifications (i.e., still acceptable but moving towards being unacceptable) or is out of specification (i.e., unacceptable), all parties with access to the central computer database 300 can be informed of the status. This can enable the manufacturer to contact the end-user, or the end-user to contact the manufacturer, to arrange maintenance or replacement of the fitting 10. Data trends can further be understood and identified by observing the information, such as what effect particular fittings, customers, installation techniques, environmental factors, etc. have on the installation, performance, and long-term function of the fitting 10 in the field. For example, data indicative of strain cracking, micro strain, or other pre-fail or failure modes can be catalogued and correlated, and then be used as a comparison against other fluid fittings in the field to determine predictive failures and identify potential remedy actions. The remote database 300 can store, analyze, transform, and report on various types of data, including some or all of historical installation sensor readings, comparison of installation sensor readings (current vs. historical), minimums/maximums, data offsets, calculations, etc. With regards to reporting, it is contemplated that the remote database 300 can be passive, in that the data and/or reports may be compiled but the user ultimately takes action based upon the data, or can be partially or wholly active, in which the remote database 300 can take further steps such as preemptively report potential problems to the manufacturer, end-user, service company, etc. based upon an analysis of the data input. Such active operation can be partially or fully automatic.

In another example, it is possible that the maximum and minimum data sets indicating that the fluid fitting 10 is installed correctly for its intended purpose may change over time. This may occur for various reasons, including further research and development, a better understanding of lifetime performance of the fluid fitting 10 in different environments, changes in manufacturing, etc. Through the use of a cloud computing environment, the maximum and minimum data sets can be easily changed in the remote database 300 and automatically applied to the data for past, present (real-time), or future sensor readings. For example, based upon experience it may be determined that a data set is too low or too high; thus, by changing the data set in a single remote database 300, it can be quickly applied across all past, present (real-time), or future sensor readings. Similarly, based upon industry or customer demand, unique or different maximum and minimum data sets can be applied to only a subset of products (i.e., only certain products of a particular customer or industry), which may change from time to time.

It is to be appreciated that the processing unit 192 and remote database 300 can be collectively described as a processing unit that performs the diagnostic procedures described above (e.g., acquiring outputs, generating data sets, comparing data sets, and/or providing an output indicating compliance of a data set). Indeed, the diagnostic procedures can be split amongst the processing unit 192 and remote database 300 such that some procedures are performed by the processing unit 192 while others are performed by the remote database 300. Moreover, the diagnostic system in some examples can exclude the processing unit 192, while the remote database 300 is configured to perform the diagnostic functions of the processing unit 192.

The diagnostic system as described above thus can determine whether the fitting 10 has been properly installed by monitoring at least two parameters of the fitting 10 and installation tool 102 (e.g., linear force F applied to the tool mechanism 102 and the distance d that the second body 132 moves from an initial position) to generate two data sets, correlating those two data sets to generate a resulting data set, and comparing that resulting data set to a predetermined data set for compliance. However, it is to be appreciated that the two properties monitored and correlated can vary by embodiment. Moreover, the diagnostic system can monitor more than two parameters and compare multiple resulting data sets with respective predetermined data sets for the purposes of redundancy. Broadly speaking, the diagnostic system can be any system that monitors at least two parameters of the fitting 10 and installation tool 102 and correlates those parameters for comparison with one or more predetermined data sets to determine whether the fitting 10 has been properly installed.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. An installation apparatus for connecting a fluid fitting to a fluid element, comprising:
    a tool mechanism that is operable to connect said fluid fitting to said fluid element, the tool mechanism comprising a first abutment surface and a second abutment surface that faces and is movable relative to the first abutment surface;
    a first sensor configured to detect a first property of the installation apparatus or fluid fitting and provide a first output corresponding to the first property;
    a second sensor configured to detect a second property of the installation apparatus or fluid fitting and provide a second output corresponding to the second property; and
    a processing unit that is configured to:
        acquire the first output from the first sensor at discrete times to generate a first data set corresponding to the first property over time,
        acquire the second output from the second sensor at the same discrete times to generate a second data set corresponding to the second property over time,
        correlate the first data set and the second data set with respect to the discrete times to generate a first resulting data set based on the first output and second output, and
        compare the resulting data set with a first predetermined data set to determine if the first resulting data set is compliant with the first predetermined data set,
    wherein the first resulting data set corresponds to the first property versus the second property, and
    wherein the fluid fitting has a central axis, and the tool mechanism is operable to connect said fluid fitting to said fluid element by moving the second abutment surface relative to the first abutment surface in an axial direction of the central axis.

2. The installation apparatus of claim 1, wherein the first predetermined data set comprises a maximum data set and a minimum data set, the maximum data set corresponding to a maximum first property versus second property, the minimum data set corresponding to a minimum first property versus second property.

3. The installation apparatus of claim 2, wherein the processing unit is configured to determine if the first resulting data set is compliant with the first predetermined data set by determining if the first resulting data set is between or equal to the maximum data set and minimum data set.

4. The installation apparatus of claim 1, wherein the processing unit is configured to provide an output based on whether the first resulting data set is compliant with the first predetermined data set.

5. The installation apparatus of claim 1, further comprising a third sensor configured to detect a third property of the installation apparatus or fluid fitting and provide a third output corresponding to the third property,
    wherein the processing unit is configured to generate a second resulting data set based on the second output and third output, and compare the second resulting data set with a second predetermined data set to determine if the second resulting data set is compliant with the second predetermined data set.

6. The installation apparatus of claim 5, wherein the processing unit is configured to provide an output based on whether the first resulting data set and second resulting data set are both in respective compliance with the first predetermined data set and second predetermined data set.

7. A method of using the installation apparatus of claim 1 to connect the fluid fitting to the fluid element, wherein the method includes:
   operating the tool mechanism to connect the fluid fitting to the fluid element;
   operating the first sensor during the step of operating the tool mechanism, wherein the first sensor detects the first property of the installation apparatus or fluid fitting and provides the first output corresponding to the first property;
   operating the second sensor during the step of operating the tool mechanism, wherein the second sensor detects the second property of the installation apparatus or fluid fitting and provides the second output corresponding to the second property; and
   operating the processing unit, wherein the processing unit:
      generates the first resulting data set based on the first output and second output,
      compares the first resulting data set with the first predetermined data set to determine if the first resulting data set is compliant with the first predetermined data set, and
      electrically operates an output device to provide an output based on whether the first resulting data set is compliant with the first predetermined data set.

8. The method of claim 7, wherein the processing unit:
   acquires the first output from the first sensor at discrete times to generate the first data set corresponding to the first property over time, and
   acquires the second output from the second sensor at the same discrete times to generate the second data set corresponding to the second property over time.

9. The method of claim 8, wherein the processing unit correlates the first data set and the second data set with respect to the discrete times to generate the first resulting data set.

10. The method of claim 9, wherein the first predetermined data set comprises a maximum data set and a minimum data set, the maximum data set corresponding to a maximum first property versus second property, the minimum data set corresponding to a minimum first property versus second property.

11. The method of claim 10, wherein the processing unit determines if the first resulting data set is compliant with the first predetermined data set by determining if the first resulting data set is between or equal to the maximum data set and minimum data set.

12. The method of claim 7, wherein the output device comprises an indicator light.

13. The method of claim 7, wherein:
   the installation apparatus further comprises a third sensor that detects a third property of the installation apparatus or fluid fitting and provides a third output corresponding to the third property, and
   the processing unit generates a second resulting data set based on the second output and third output, and compares the second resulting data set with a second predetermined data set to determine if the second resulting data set is compliant with the second predetermined data set.

14. The method of claim 7, wherein the fluid fitting comprises a coupling body defining a bore for receiving the fluid element therein at an end of the coupling body, and a ring configured to fit over the end of the coupling body for mechanically attaching said coupling body to the fluid element, the coupling body including a seal portion for engaging the fluid element, wherein the method comprises:
   providing the fluid fitting in a pre-installed configuration wherein the drive ring is arranged over the end of the coupling body,
   arranging the fluid element within the bore of the coupling body, and
   arranging the fluid fitting relative to the tool mechanism while the fluid fitting is in the pre-installed configuration, such that the first abutment surface faces a surface of the coupling body and the second abutment surface faces a surface of the drive ring,
   wherein the step of operating the tool mechanism axially forces the drive ring along the central axis such that the drive ring deforms elastically to an expanded condition and applies a compressive force to the seal portion sufficient to cause permanent deformation of the coupling body such that a tooth of the seal portion bites into the fluid element to thereby attach the fluid element to the coupling body in a non-leaking manner.

15. An installation apparatus for connecting a fluid fitting to a fluid element, comprising:
   a tool mechanism that is operable to connect said fluid fitting to said fluid element, the tool mechanism comprising a first abutment surface and a second abutment surface that faces and is movable relative to the first abutment surface;
   a first sensor configured to detect a first property of the installation apparatus or fluid fitting and provide a first output corresponding to the first property;
   a second sensor configured to detect a second property of the installation apparatus or fluid fitting and provide a second output corresponding to the second property; and
   a processing unit that is configured to;
      acquire the first output from the first sensor at discrete times to generate a first data set corresponding to the first property over time,
      acquire the second output from the second sensor at the same discrete times to generate a second data set corresponding to the second property over time,
      correlate the first data set and the second data set with respect to the discrete times to generate a first resulting data set based on the first output and second output, and
      compare the resulting data set with a first predetermined data set to determine if the first resulting data set is compliant with the first predetermined data set,
   wherein the first property corresponds to a force property and the second property corresponds to a spatial property, and
   wherein the fluid fitting has a central axis, and the tool mechanism is operable to connect said fluid fitting to said fluid element by moving the second abutment surface relative to the first abutment surface in an axial direction of the central axis.

16. The installation apparatus of claim 15, wherein the second property is a distance property.

17. An installation apparatus for connecting a fluid fitting to a fluid element, comprising:
- a tool mechanism that is operable to connect said fluid fitting to said fluid element, the tool mechanism comprising a first abutment surface and a second abutment surface that faces and is movable relative to the first abutment surface;
- a first sensor configured to detect a first property of the installation apparatus or fluid fitting and provide a first output corresponding to the first property;
- a second sensor configured to detect a second property of the installation apparatus or fluid fitting and provide a second output corresponding to the second property; and
- a processing unit that is configured to;
  - acquire the first output from the first sensor at discrete times to generate a first data set corresponding to the first property over time,
  - acquire the second output from the second sensor at the same discrete times to generate a second data set corresponding to the second property over time,
  - correlate the first data set and the second data set with respect to the discrete times to generate a first resulting data set based on the first output and second output, and
  - compare the resulting data set with a first predetermined data set to determine if the first resulting data set is compliant with the first predetermined data set,
- wherein the first property corresponds to a strain property and the second property corresponds to a spatial property, and
- wherein the fluid fitting has a central axis, and the tool mechanism is operable to connect said fluid fitting to said fluid element by moving the second abutment surface relative to the first abutment surface in an axial direction of the central axis.

18. The installation apparatus of claim 17, wherein the second property is a distance property.

\* \* \* \* \*